United States Patent [19]

Selm et al.

[11] 4,350,597
[45] Sep. 21, 1982

[54] APPARATUS AND PROCESS FOR TREATMENT OF SLUDGE

[75] Inventors: Robert P. Selm; Leland M. Shepard, both of Salina, Kans.

[73] Assignee: Wilson & Company, Salina, Kans.

[21] Appl. No.: 202,690

[22] Filed: Oct. 31, 1980

[51] Int. Cl.³ .............................................. C02F 1/52
[52] U.S. Cl. ................... 210/710; 134/13; 156/642; 210/712; 210/724; 210/726; 210/751; 210/772; 210/901; 210/912; 210/913
[58] Field of Search ................. 134/13, 109, 110; 156/642; 210/710–712, 716, 717, 724, 726, 751, 772, 198.1, 203, 205, 206, 216, 400, 401, 912, 913, 901

[56] References Cited

U.S. PATENT DOCUMENTS

| | | | |
|---|---|---|---|
| 2,132,585 | 10/1938 | Spittle | 423/183 |
| 3,345,288 | 10/1967 | Sontheimer | 210/711 |
| 3,486,954 | 12/1969 | Ashcraft | 156/642 |
| 3,607,482 | 9/1971 | Selm | 156/642 |
| 3,712,838 | 1/1973 | Weissenberg | 156/642 |
| 3,943,233 | 3/1976 | Swanson et al. | 210/401 |
| 4,017,343 | 4/1977 | Haas | 156/642 |
| 4,044,106 | 8/1977 | Fang | 134/13 |
| 4,136,026 | 1/1979 | Meyer | 156/642 |
| 4,176,160 | 11/1979 | Pavonet | 210/772 |
| 4,289,616 | 9/1981 | Hallack et al. | 210/401 |

FOREIGN PATENT DOCUMENTS 1517689  9/1969  Fed. Rep. of Germany ...... 210/912

Primary Examiner—Peter A. Hruskoci
Attorney, Agent, or Firm—Litman, Day and McMahon

[57] ABSTRACT

An apparatus and a process are provided which are particularly suited for treatment of sludge eminating from a metal finishing solution regeneration process, especially aluminum finishing solution. The sludge is washed on a horizontal belt vacuum filter from which a majority of the washing fluid is returned to the regeneration process. A portion of the washing water is wasted. After washing, the sludge is reslurried. Thereafter, the reslurried sludge is pumped to a reaction vessel in the presence of carbon dioxide under pressure. Sufficient carbon dioxide is provided to react with excess lime in the sludge to produce calcium carbonate and a substantially neutral pH. The sludge after carbonation is dewatered in a rotary drum vacuum filter and thereafter is suitable for placement in a landfill.

11 Claims, 1 Drawing Figure

APPARATUS AND PROCESS FOR TREATMENT OF SLUDGE

BACKGROUND OF THE INVENTION

The present invention relates to treatment of solutions utilized in the metal finishing industries and, in particular, to a process wherein sludge produced during regeneration of the metal finishing solutions and containing a high percentage of calcium aluminate, among other solution constituents, is treated to remove undesirable characteristics thereof such that the sludge may be disposed of in a non-harazdous landfill.

Various metals, such as aluminum and the alloys thereof, are often pickled, milled, etched, cleaned and the like by various chemical solutions, such as sodium hydroxide (caustic soda) in an aqueous solution. These processes are generally referred to as metal finishing herein.

Typically in these finishing processes an exposed portion of metal, for example aluminum, is removed by reaction with a chemical milling agent such as sodium hydroxide. Lime may be added to the solution after the milling process to precipitate previously soluble aluminum salts as generally insoluble calcium aluminate thereby regenerating the milling solution by reforming sodium hydroxide. This regeneration process is thoroughly discussed in applicant's U.S. Pat. No. 3,607,482, PROCESS OF REGENERATION OF METAL TREATING SOLUTIONS, the disclosure contained in such patent being included herein by reference. The precipitate formed in the above discussed regeneration process actually contains a number of constituents which in general are referred to herein as a calcium aluminate sludge. Normally, the sludge contains approximately the following quantities as a percent by weight:

| Calcium Aluminate | 60–80 percent |
| Metal Sulfides (Si, Fe, Cu, Mn, Mg, Zn) | 0–10 percent |
| Calcium Carbonate | 4–8 percent |
| Calcium Hydroxide | 15–20 percent |

It is noted that the above percentages are given as an example only and that these percentages can vary greatly. In addition, it is possible to remove the metal sulfides prior to the above discussed lime addition. The precipitated sludge is preferably removed from the chemical milling solution after the solution of lime by operation of a clarifier. The clarifier mother liquor consists heavily of sodium hydroxide in an aqueous solution along with other minor constituents including aluminum and sodium gluconate or the like. It is normal for the sludge to have some contamination from the mother liquor.

Because of continually upwardly spiraling costs related to safe operation of chemical disposal sites and increasing governmental regulations directed to disposal of chemical wastes, it has become increasingly difficult to afford and/or even find a suitable disposal site for the precipitated sludge. A major environmental problem associated with the sludge is that some of the constituents thereof may be leachable so as to eventually become dislocated from the disposal site and find their way into underground or surface water systems.

Not only are the leachable components of the sludge a problem, the pH of the sludge even without the leachable items is often above an acceptable level for disposal in a non-hazardous landfill. In particular, the calcium hydroxide produces a pH in the nature of 12.

OBJECTS OF THE INVENTION

Therefore the principal objects of the present invention are: to provide a process for the treatment of precipitated sludge formed during the regeneration of metal finishing solutions, particularly alkaline caustic solutions to etch aluminum and its alloys produced during sizing, milling, cleaning, etching, and the like of the aluminum; to provide such a process wherein the sludge is made safe for disposal in non-hazardous landfills; to provide such a process wherein leachable materials are removed from the sludge; to provide such a process wherein calcium hydroxide in the sludge is neutralized such that the sludge obtains a satisfactory pH for disposal thereof in a non-hazardous landfill; to provide such a process comprising a series of washing steps and treatment of the sludge with carbon dioxide under pressure to remove the leachable materials and to produce an acceptable pH level; to provide an apparatus to carry out the steps required in the above described process; and to provide such an apparatus and such a process which are economical to use and particularly well adapted for the proposed usage thereof.

Other objects and advantages of this invention will become apparent from the following description taken in connection with the accompanying drawings wherein are set forth by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

Figure 1:
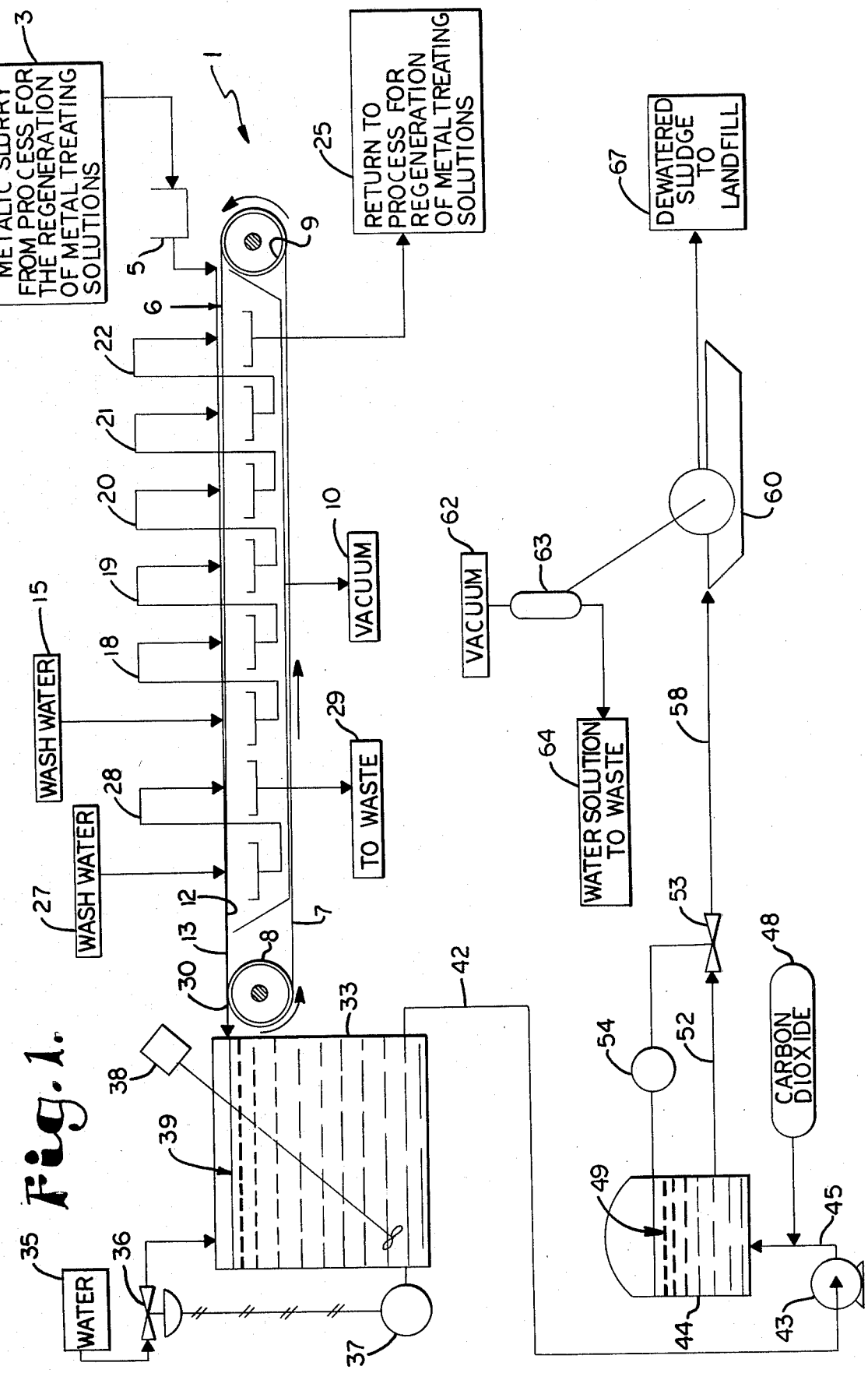
FIG. 1 is a schematic flow diagram for a process embodying the present invention.

As required, a detailed embodiment of the present invention is disclosed herein; however, it is to be understood that the disclosed embodiment is merely exemplary of the invention which may be embodied in various forms. Therefore, specific structural, functional and process details disclosed herein are not to be interpreted as limiting, but merely as a basis for the claims and as a representative basis for teaching one skilled in the art to variously employ the present invention in virtually any appropriately detailed process or structure.

Referring in detail to the particular embodiments illustrated in the drawing, the reference numeral 1 generally designates a process for treating precipitated sludge comprising a metallic salt slurry from a process for the regeneration of metallic treating solutions generally designated by the box 3. Normally the sludge will be the precipitated outflow of a clarifier (not shown). The sludge may be moved in a rather dry form or preferably as a somewhat liquified slurry having been mixed with water or the like. The sludge in the present embodiment typically includes calcium aluminate and calcium hydroxide along with other minor constituents. The sludge passes through a small holding tank or device 5 and is thereafter deposited upon a horizontal-belt vacuum filter 6. The filter 6 includes a long porous belt 7 with suitable drive wheel 8 and idler wheel 9 to provide rotary movement to the belt 7. A vacuum means such as a compressor or other suitable device designated by the box 10 pulls a vacuum upon the lower side 12 of an upper portion 13 of the belt 7, so as to draw fluids, in particular, water with soluble materials therein, through the porous belt 7. A wash water system generally designated by the box 15 supplies water which is utilized to counter current wash the sludge as it passes down the belt 7. Numerous wash water recycle collection and redistribution systems 18, 19, 20, 21 and 22 are provided to function as washing stations or stages along the belt 7. In this manner, the wash water having the least contamination first engages the sludge at a location along the belt 7 near the discharge of the sludge from the belt 7. After the last washing stage designated by the numeral 22, the wash water is returned to the process for regeneration of metal treating solutions generally designated by the box 25, normally so as to enter the above discussed clarifier (not shown) at a location spaced from that location generally designated by the box 3. In some situations it may be desirable to further wash the sludge to insure removal of all soluble or leachable materials therefrom. In such situations, additional wash water generally designated by the box 27 may be distributed along the belt near the discharge thereof and recycled through various additional stages such as 28, as required to remove substantially all leachable material. Provided that the later wash water does not become overly contaminated with solubles, this water may be wasted such as is generally designated by the box 29 or returned to the regeneration process.

The sludge exits the filter 6 at a discharge end 30 thereof in a substantially deliquified state and with a substantial amount of the solubles previously contained therein having been removed therefrom. At this time the sludge with solubles removed therefrom is placed into a slurry forming tank 33. Water designated by box 35 enters the slurry tank in a controlled manner through valve 36 which is operated by a controller 37 so as to form a suitable liquid component in conjunction with the sludge for reslurrying same. An agitator 38 is provided for the tank 33. The sludge-water slurry is generally designated 39 and contains suitable water to reliquify the sludge under agitation. The sludge-water slurry 39 exits the tank 33 through suitable conduit 42 and is pressurized by pump 43 thereafter entering pressurized tank 44 through conduit 45. Carbon dioxide generally designated by the box 48 is added under pressure to the conduit 45. The carbon dioxide is added to the sludge-water slurry in stoichiometric quantities sufficient or slightly in excess of the amount necessary to react with the calcium hydroxide (lime) according to the following reaction:

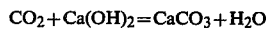

$CO_2 + Ca(OH)_2 = CaCO_3 + H_2O$

After some residence time in the tank 44 so as to provide for reaction between the carbon dioxide and calcium hydroxide, the solution 49 within the tank 44 is allowed to exit the tank 44 through conduit 52 and valve 53 which is operated by level controller 54. After passing through the valve 53, the solution 49 enters a rotary drum vacuum filter 60 having a suitable vacuum means such as a compressor or the like designated by box 62 and a fallout tank 63 with suitable means to remove liquid collected in the fallout tank 63 such as a take-off controller or the like generally designated as box 64. The box 64 also illustrates that the fluid removed by the vacuum filter 60 is normally sent to waste and the water solution is generally of a neutral pH having very low soluble solids contained therein. After passage through the vacuum filter 60 the de-watered sludge having solubles and calcium hydroxide generally removed therefrom is transferred substantially as a solid to a nonhazardous landfill as generally designated by the box 67.

Under proper control conditions of addition of carbon dioxide to sludge, the pH of the sludge exiting the process and generally designated by the box 67 will be in the nature of 5 to 9 and under fairly close controls will be preferably 7.

It is noted that, although the process for regeneration as described herein utilizes calcium hydroxide with a consequent reduction of calcium hydroxide by carbon dioxide, it is foreseen that an equivalent process could be utilized whenever the process for regeneration utilizes either barium hydroxide or strontium hydroxide with a substantially equivalent result.

The following example is disclosed to illustrate an embodiment of the process of the present invention but is not meant to be limiting with respect to the claims herein.

EXAMPLE

An aqueous solution of sodium hydroxide utilized to mill aluminum so as to remove a portion of the surface of the aluminum in a predetermined manner and to produce sodium aluminate solution according to the following reaction:

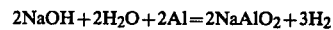

$2NaOH + 2H_2O + 2Al = 2NaAlO_2 + 3H_2$ along with accompanying side reactions. The sodium aluminate solution is removed from the milling bath and placed in a clarifier with excess calcium hydroxide (lime) so as to stoichiometrically react with the sodium aluminate and form an insoluble calcium salt, normally tri-calcium aluminate hexahydrate. In the clarifier a supernatant or mother liquor and a precipitated sludge are formed. The mother liquor would typically comprise an aqueous solution having 12 to 36 ounces per gallon of sodium hydroxide, 0 to 20 ounces per gallon of aluminum, 0.25 to 4.4 ounces per gallon of $Na_2S$ and either 0.27 to 0.44 ounces per gallon of sodium gluconate or 6.0 to 6.5 ounces per gallon of triethanolamine. A typical composition of the sludge by weight is: tri-calcium aluminate hexahydrate in the amount of about 70 percent, metal sulphites in the amount of approximately 7 percent, calcium carbonate in the amount of approximately 6 percent, and calcium hydroxide in the amount of approximately 17 percent. Both the mother liquor and the precipitated sludge contain minor portions of the major components of the other. The precipitated sludge is removed from the clarifier and passed through a cascade or stage washing process wherein a substantial amount of soluble components, mainly normal constituents of the mother liquor, contained therein are removed. A substantial portion of the wash water containing the solubles from the precipitated sludge is returned to the clarifier. The sludge with soluble components substantially removed therefrom is reslurried where necessary and mixed with carbon dioxide, preferably under pressure, in at least a stoichiometric amount so as to react with the calcium hydroxide contained within the sludge so as to form calcium carbonate. The pH of the resultant solution after mixing the carbon dioxide with the sludge is approximately maintained at 7 by selectively varying addition of the carbon dioxide.

It is to be understood that while certain embodiments of the present invention have been described and shown herein, it is not to be limited to specific processes or arrangement of parts herein described and shown.

What is claimed and desired to be secured by Letters Patent is as follows:

1. In a process for regeneration of spent metal treating solutions including the steps of: collecting a metal-treating solution portion, said solution portion containing metal salts of a metal being treated in a treating receptacle; introducing a precipitating agent into said collected solution portion; mixing the precipitating agent and collected solution portion; settling out solids formed in the mixture to provide a supernatant solution; returning the supernatant solution to the treating receptacle; said metal salts in the metal-treating solution are at least one of a class consisting of carbonates, sulfates, chromates and aluminates; and said precipitating agent is an hydroxide of a metal selected from a class consisting of calcium, barium and strontium; the improvement including the following steps for making said solids suitable for disposal in a landfill:
   (a) passing said solids through filtering means so as to substantially separate said solids from said supernatant solution and produce a sludge, including the metal hydroxide of said precipitating agent, in a substantially deliquified state;
   (b) reslurrying the solids with water after separation from said supernatant solution in a vessel;
   (c) injecting carbon dioxide into said reslurried solids in a purified amount to substantially react stoichiometrically with the metal hydroxide of said precipitating agent within said reslurried solids and to produce a generally water insoluble carbonate of the metal of said precipitating agent therein; and
   (d) thereafter separating said solids substantially including the metal carbonates from the water associated therewith after injection of said carbon dioxide to form a substantially liquid-free component suitable for disposal in a landfill.

2. The process according to claim 1 wherein:
   (a) said precipitating agent is calcium hydroxide;
   (b) said metal is aluminum; and
   (c) said metal salts comprise sodium aluminate.

3. In a process for regeneration of spent aluminum treating solutions from aluminum metal finishing wherein aluminum is removed by treatment with sodium hydroxide including the steps of: collecting an aluminum treating solution portion, said solution portion containing aluminum salts removed from aluminum being treated in a treating receptacle; introducing a precipitating agent comprising calcium hydroxide into said collected solution portion; mixing the precipitating agent and collected solution portion; settling out solids formed in the mixture to provide a supernatant solution; and returning the supernatant solution to the treating receptacle; the improvement including the following steps for making said solids suitable for disposal in a landfill:
   (a) passing said solids through filtering means so as to substantially separate said solids from said supernatant solution and produce a sludge including calcium hydroxide in a substantially deliquified state;
   (b) reslurrying the solids with water after separation from said supernatant solution in a vessel;
   (c) injecting carbon dioxide into said reslurried solids in a sufficient amount to substantially react stoichiometrically with the calcium hydroxide within said reslurried solids and to produce calcium carbonate therein; and
   (d) thereafter separating said solids, substantially including the calcium carbonates, from the water associated therewith after injection of said carbon dioxide to form a substantially liquid-free component suitable for disposal in a landfill.

4. The process according to claim 1 or 3 including the steps of:
   (a) water washing said solids after separation from said supernatant solution to remove a substantial amount of aqueous soluble material therefrom.

5. The process according to claim 4 including the steps of:
   (a) recycling the water from said water washing with said removed soluble material therein to said collected solution portion.

6. The process according to claim 4 including:
   (a) passing said slurried solids through a vacuum filter to deslurry said solids after addition of carbon dioxide thereto.

7. The process according to claim 2 or 3 including the step of:
   (a) allowing said injected carbon dioxide to react with said slurried solids in a reaction vessel.

8. The process according to claim 7 including the step of:
   (a) pressurizing said reaction vessel above atmospheric pressure.

9. The process according to claim 1 or 3 wherein:
   (a) adding said carbon dioxide to said slurried solids in an amount to bring the pH of said slurried solids within the range of approximately 5 to 9.

10. The process according to claim 9 wherein:
    (a) said pH is approximately 7.

11. In a process for regeneration of spent aluminum treating solutions from aluminum metal finishing wherein aluminum is removed by treatment with sodium hydroxide including the steps of: collecting an aluminum treating solution portion, said solution portion containing aluminum salts removed from aluminum being treated in a treating receptacle; introducing a precipitating agent comprising calcium hydroxide into said collected solution portion; mixing the precipitating agent and collected solution portion; settling out solids formed in the mixture to provide a supernatant solution; and returning the supernatant solution to the treating receptacle; the improvement including the following steps for making said solids suitable for disposal in a landfill:
    (a) passing said solids through a continuous belt countercurrent wash filter so as to substantially separate said solids from said supernatant solution and produce a sludge including calcium hydroxide in a substantially deliquified state;
    (b) washing said solids with wash water while on said filter belt;
    (c) returning said wash water after washing said solids to said collected solution portion;
    (d) reslurrying the solids with water after separation from said supernatant solution in a vessel;
    (e) injecting carbon dioxide under substantial pressure into said reslurried solids in a sufficient amount to substantially react stoichiometrically with the calcium hydroxide within said reslurried solids and to produce calcium carbonate therein; and (f) thereafter separating said solids substantially including said calcium carbonates from the water associated therewith after injection of said carbon dioxide to form a substantially liquid-free component suitable for disposal in a landfill.

* * * * *